United States Patent
He et al.

(10) Patent No.: US 10,911,181 B2
(45) Date of Patent: Feb. 2, 2021

(54) METHOD FOR CHECKING ADDRESS AND CONTROL SIGNAL INTEGRITY IN FUNCTIONAL SAFETY APPLICATIONS, RELATED PRODUCTS

(71) Applicant: HANGZHOU FABU TECHNOLOGY CO., LTD., Hangzhou (CN)

(72) Inventors: Xiaofei He, Hangzhou (CN); Jeffrey Chu, San Diego, CA (US); Hang Nguyen, Tempe, AZ (US)

(73) Assignee: HANGZHOU FABU TECHNOLOGY CO., LTD., Hangzhou (CN)

( * ) Notice: Subject to any disclaimer, the term of this patent is extended or adjusted under 35 U.S.C. 154(b) by 42 days.

(21) Appl. No.: 16/409,739

(22) Filed: May 10, 2019

(65) Prior Publication Data

US 2020/0319969 A1    Oct. 8, 2020

Related U.S. Application Data

(63) Continuation of application No. PCT/CN2019/008105, filed on Apr. 2, 2019.

(51) Int. Cl.
| | |
|---|---|
| *H04L 1/00* | (2006.01) |
| *G06F 11/30* | (2006.01) |
| *G06F 11/10* | (2006.01) |

(52) U.S. Cl.
CPC ........ *H04L 1/0072* (2013.01); *G06F 11/1076* (2013.01); *G06F 11/3037* (2013.01)

(58) Field of Classification Search
CPC ............. G06F 11/1076; G06F 11/3037; G06F 11/1048; H04L 1/0072
See application file for complete search history.

(56) References Cited

U.S. PATENT DOCUMENTS 8,560,932 B2 * 10/2013 Kleihorst ........... G01R 31/3193
                                                        714/803
2005/0022074 A1 *  1/2005 Kuznnenka ........... G06F 11/073
                                                          714/57

(Continued)

FOREIGN PATENT DOCUMENTS

| CN | 105868125 A | 8/2016 |
| CN | 107557984 A | 1/2018 |

OTHER PUBLICATIONS

The International Search Report of corresponding International application No. PCT/CN2019/081051, dated Dec. 27, 2019.

*Primary Examiner* — Steve N Nguyen
(74) *Attorney, Agent, or Firm* — J.C. Patents

(57) ABSTRACT

The present disclosure provides a method for checking a to-be-checked signal and related products. The method is applied in a checking device and includes: a first obtaining module, configured to obtain a to-be-checked signal carrying first control information, wherein the first control information is generated based on original control information; a second obtaining module, configured to obtain original checking information; a determining module, configured to determine the first control information according to the to-be-checked signal; and a checking module, configured to check correctness of the first control information according to the original checking information. The present disclosure can be used to enable reliability and functional safety on devices originally designed without features intended to support those functions.

5 Claims, 5 Drawing Sheets

(56) References Cited

U.S. PATENT DOCUMENTS

2014/0041033 A1    2/2014  Durham et al.
2015/0365104 A1  12/2015  Jeong
2019/0205225 A1*  7/2019  Kim .................... G06F 13/4239

* cited by examiner

METHOD FOR CHECKING ADDRESS AND CONTROL SIGNAL INTEGRITY IN FUNCTIONAL SAFETY APPLICATIONS, RELATED PRODUCTS

CROSS-REFERENCE TO RELATED APPLICATIONS

This application is a continuation of International Application No. PCT/CN2019/081051, filed on Apr. 2, 2019 and entitled "METHOD FOR CHECKING ADDRESS AND CONTROL SIGNAL INTEGRITY IN FUNCTIONAL SAFETY APPLICATIONS, RELATED PRODUCTS", the disclosure of which is hereby incorporated by reference in its entirety.

TECHNICAL FIELD

The present disclosure relates to the technical field of computer technologies, and in particular, to a method for checking an address or control signal in products demanding high reliability and/or functional safety, and related products.

BACKGROUND

When a processor or a direct memory access (DMA)-enabled device needs to read or write to a memory location, an appropriate line (read or write) will be active (logic one) according to a command for reading or writing on a control bus, then an address bus specifies that memory location on the address bus, thus achieving the reading or writing of the data carried on the data bus.

Data validation is necessary to ensure the data integrity, that is, to ensure that the data to be read or written is both correct and useful. Data validation uses routines, often called "validation rules" "validation constraints" or "check routines", that check for correctness, meaningfulness, and security of data that are input to the system. Data validation not only applies to the correctness of the data written or read itself, but to the location to where data is read and written. For example, for each memory access command, an address and the valid bytes of each data word to be written or read from memory would be issued as part of the transaction. Even if the data is correct itself, should the address or number of valid bytes to be accessed is incorrect, the memory access is invalid. For example, if the control indicating the number of bytes to be written is long by 1 byte, valid data may be corrupted in the system despite the written data to memory being valid.

This background information is provided to reveal information believed by the applicant to be of possible relevance to the present disclosure. No admission is necessarily intended, nor should be construed, that any of the preceding information constitutes prior art against the present disclosure.

SUMMARY

In view of the above, the present disclosure provides a method to check an address or control signal, for example, address and control signaling with minimal hardware area/cost and minimal to no computational overhead. The present disclosure can be used to enable reliability and functional safety on devices originally designed without features intended to support those functions.

The foregoing and other objects are achieved by the subject matter of the independent claims. Further implementation forms are apparent from the dependent claims, the description and the figures.

A first aspect of the present disclosure relates to a method for checking a to-be-checked signal, including:

obtaining the to-be-checked signal carrying first control information, wherein the first control information is generated based on original control information, the original control information indicating at least one of an original address to be accessed by a checking device and an original operation to be executed by the checking device;

obtaining original checking information;

determining the first control information according to the to-be-checked signal; and checking correctness of the first control information according to the original checking information.

A second aspect of the present disclosure relates to a first checking device, including:

a first obtaining module, configured to obtain a to-be-checked signal carrying first control information, wherein the first control information is generated based on original control information;

a second obtaining module, configured to obtain original checking information;

a determining module, configured to determine the first control information according to the to-be-checked signal; and a checking module, configured to check correctness of the first control information according to the original checking information.

A third aspect of the present disclosure relates to a first checking device, including a processor means and a memory means storing a computer program which when being executed by the processor means causes the processor means to:

obtain the to-be-checked signal carrying first control information, wherein the first control information is generated based on original control information;

obtain original checking information;

determine the first control information according to the to-be-checked signal; and check correctness of the first control information according to the original checking information.

A fourth aspect of the present disclosure relates to a second checking device, comprising a processor means and a memory means storing a computer program which when being executed by the processor means causes the processor means to:

receive a control signal carrying original control information and original checking information;

generate second control information according to the original control information;

compute second checking information according to the second control information; and determine whether the original checking information corresponds to the second checking information.

A fifth aspect of the present disclosure relates to a system on chip, including a first checking device according to the third aspect or a second checking device according to the fourth aspect.

BRIEF DESCRIPTION OF DRAWINGS

The accompanying drawings are used to provide a further understanding of the present disclosure, constitute a part of the specification, and are used to explain the present disclosure together with the following specific embodiments, but should not be construed as limiting the present disclosure.

DESCRIPTION OF EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

In order to better describe the technical solutions of the present disclosure, a related system will be described with reference to FIG. 1 in the first place.

Figure 1:
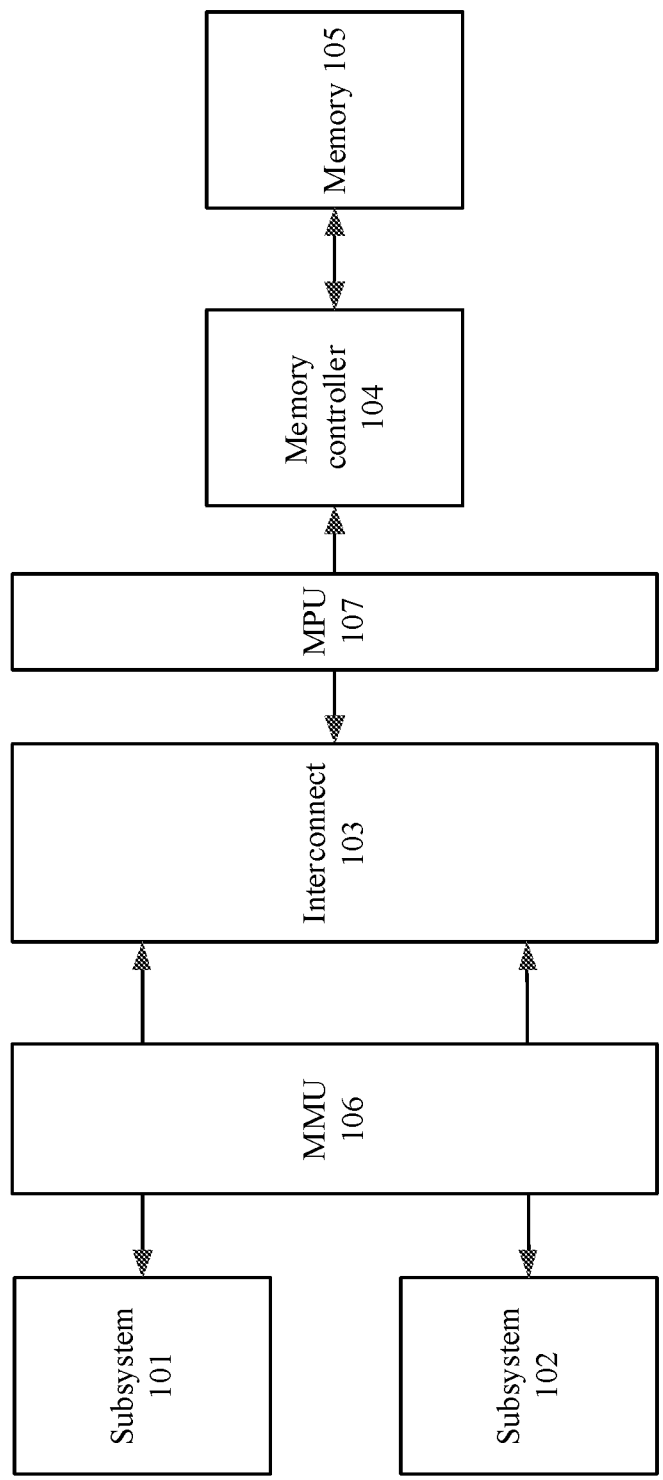
FIG. 1 is a systematic diagram of a system in which a method for checking a to-be-checked signal is applied according to an embodiment of the present disclosure.

FIG. 1 is a systematic diagram of a system in which a method for checking a to-be-checked signal is applied according to an embodiment of the present disclosure. As shown in FIG. 1, the system may include at least one subsystem such as a subsystem 101 and a subsystem 102 in FIG. 1, a forwarding device 103, a memory controller 104 and a memory 105 controlled by the memory controller 104. In an embodiment, the system may also include a memory manage unit (MMU) 106 and a memory protection unit (MPU) 107.

The subsystem 101 and the subsystem 102 may interact with a central processor unit (CPU) (not shown) to perform corresponding operations. Each subsystem may have different functions. For example, the subsystem 101 may be an accelerator for image signal processing (ISP), and the subsystem 102 may be a deep learning accelerator (DLA).

The reading or writing of data into the memory 105 may be achieved through interactions among the aforementioned components. Take the case where the subsystem 102 writes data into the memory 105 as an example, the subsystem 102 receives a control signal from the CPU, generates a virtual address according to the received control signal. The generated virtual address is then transmitted to the MMU 106, which then transfers the virtual address into a physical address and transmits the physical address to the forwarding device 103. The forwarding device 103, which may be buses for example, may packet several requested physical addresses together and transmits the packet to the MPU 107. Then, the MPU 107 may pass the physical address to the memory controller 104 and the data value carried on a data bus may then be written into that physical address of the memory 105. The memory 105 here may be a double data rate (DDR) synchronous dynamic random access memory (SDRAM). It may also be other kinds of memories that are accessible by the memory controller 104.

During the above process, the integrity of the address may be checked in different components using different methods. The checking may be done at the subsystem, at the MMU, at the MPU or at the forwarding device.

For example, for each requested virtual address, the subsystem may duplicate the address generator, generate two addresses at different moments, and compare the two generated addresses. If the two addresses do not match, then flag an error.

Alternatively, at the MMU 106, the virtual address space may be partitioned into three parts, where a first part is only accessible by the subsystem 101, a second part only accessible by the subsystem 102, and a third part serves as a shared part and is accessible by both of the subsystem 101 and the subsystem 102. Upon receiving the virtual address requested by the subsystem 102, the MMU 106 may check whether the virtual address is within a predefined range corresponding to the subsystem 102, once the virtual address requested by the subsystem 102 passes the checking, the MMU 106 may transfer the virtual address into a physical address and pass it to the forwarding device 103.

The checking may also be done at the MPU 107, upon receiving the physical address forwarded by the forwarding device 103, the MPU 107 may check whether the physical address is within a predefined range corresponding to a master identifier (ID) of the subsystem 102. This physical address may be passed to the memory controller 104 once the checking is successful.

As described above, the above checking may be superposed, i.e., the checking of the address may be done for several times at several places, or the checking may be done only once. However, the checking at the subsystem costs high due to the redundancy of the address generator. The checking at the MMU and the MPU is interval-based, that is to say, the checking is to determine whether the requested address falls within a predefined address interval, therefore, bit flips may not be detected through these checks. Besides, the checking at the forwarding device may be supported at high costs, since the signal passed from the subsystem to the memory controller has to carry redundancy bits for checking or duplication in hardware.

Aiming at such problems, the present disclosure provides a method for checking a to-be-checked signal for integrity of the control signal with lower costs. In the following, the method will be described in detail with reference to the accompany drawings.

Figure 2A:
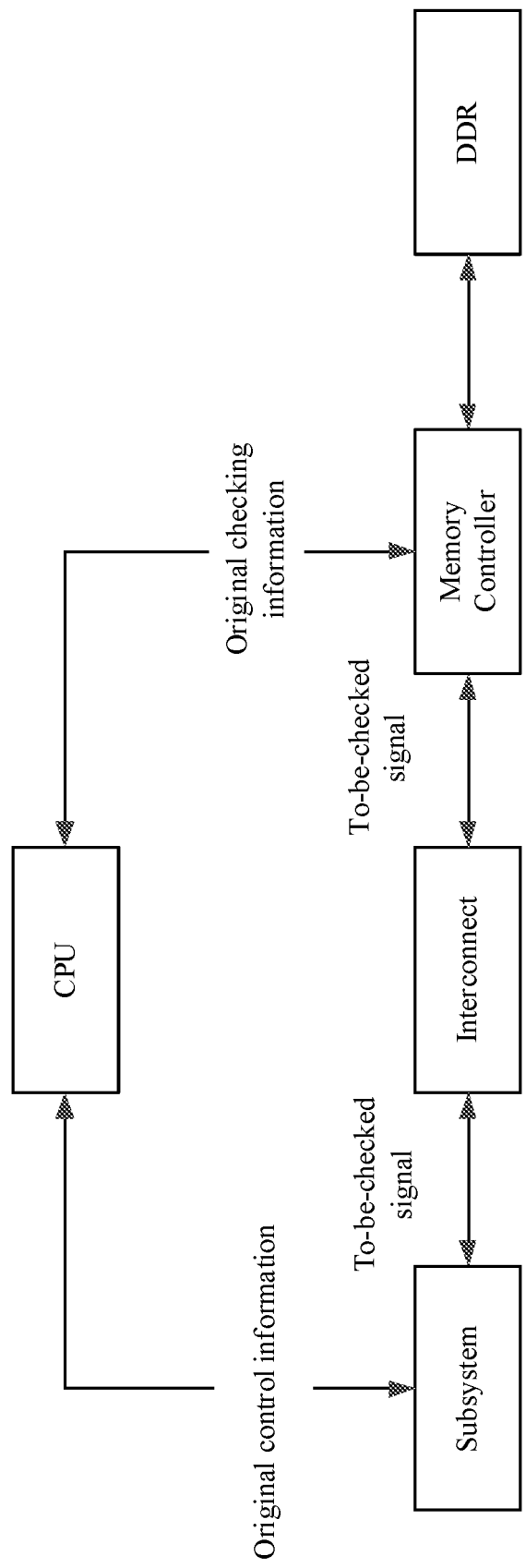
FIG. 2*a* and FIG. 2*b* are systematic diagrams showing the signal flow and basic functions of each component according to an embodiment of the present disclosure.

FIG. 2a is a systematic diagram showing the signal flow and basic functions of each component according to an embodiment of the present disclosure. In the present disclosure, the CPU may transmit a control signal to the subsystem (either of the subsystems shown in FIG. 1), the control signal includes original control information (for example, an initial address from which a sequence of addresses to be accessed by the subsystem and further by the memory controller may be derived) and then may transmit original checking information to the memory controller, the original checking information is used to check the correctness of first control information received by the memory controller. Then, the subsystem may generate first control information and transmit the first control information in a to-be-checked signal, and the to-be-checked signal is then received by the memory controller, the memory controller then monitors the to-be-checked signal, computes first checking information based on the first control information and compares the first checking information with the original checking information.

Figure 2B:
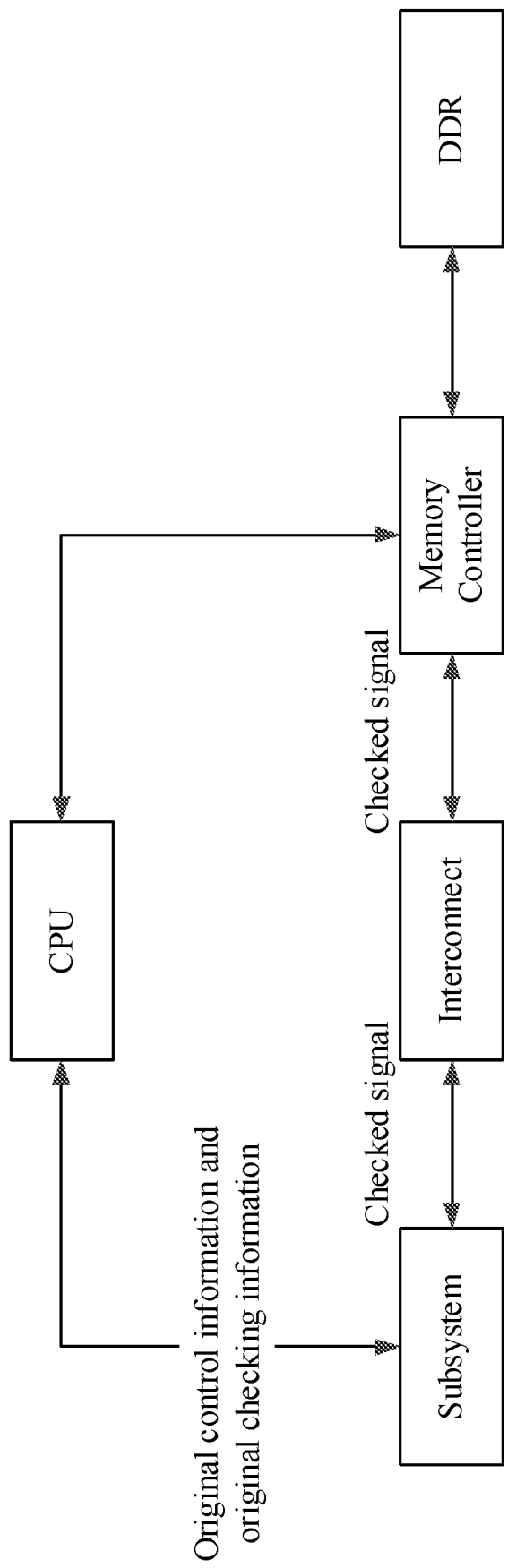

In an embodiment, as shown in FIG. 2b, the checking may also be done at the subsystem. In this way, the CPU may transmit the control signal to the subsystem (either of the subsystems shown in FIG. 1), the control signal includes original control information (for example, a sequence of addresses to be accessed by the subsystem and further by the memory controller) and original checking information, then the subsystem may generate second control information, compute second checking information based on the second control information, and compare the second checking information with the original checking information.

In both cases, either the checked signal or the to-be-checked signal transmitted from the subsystem to the memory controller may include no hardware redundancy for checking, therefore, comparing with the existing control signal checking methods from subsystem to memory controller, saves significant costs.

Figure 3:
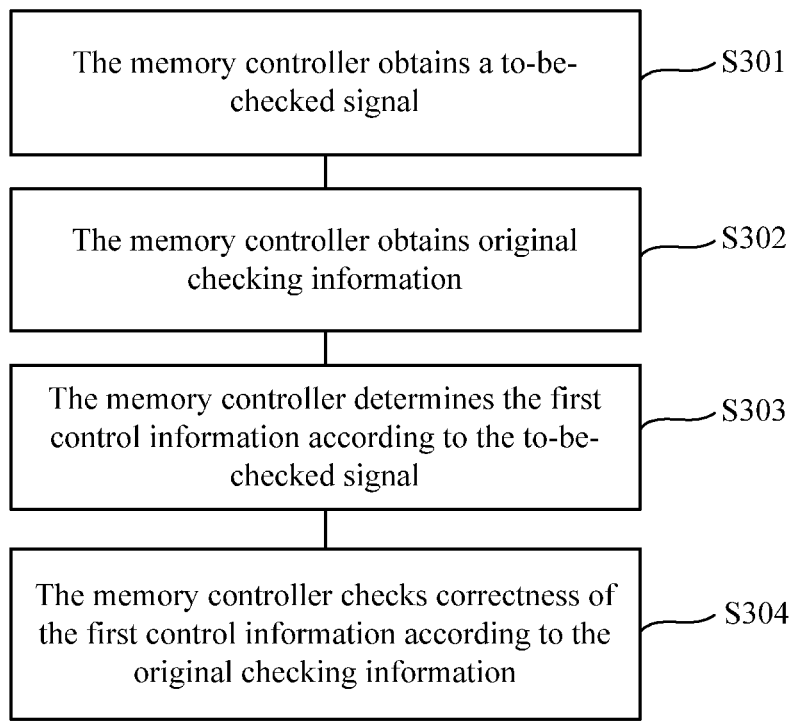
FIG. 3 is a schematic flowchart of a method for checking a to-be-checked signal according to an embodiment of the present disclosure.

FIG. 3 is a schematic flowchart of a method for checking a to-be-checked signal according to an embodiment of the present disclosure. The executive subject matter of the method may be a checking device. As shown in FIG. 1, the checking device may be either of the subsystems, or may be the memory controller, or other components capable of processing a control signal, which is not limited herein. In the following description, the case where the checking device is the memory controller will be taken as example.

S301: the memory controller obtains a to-be-checked signal.

The to-be-checked signal carries first control information, the first control information may be generated based on original control information by the subsystem, the original control information may be transmitted from the CPU to the subsystem.

The original control information may carry at least one of address information and operation information or both. In an embodiment, the original control information may indicate a first address to be accessed by the subsystem.

S302: the memory controller obtains original checking information.

The memory controller may receive original checking information from the CPU, this checking information is for the memory controller to check the correctness of the first control information contained in the to-be-checked signal, the first control information may be generated by the subsystem based on the original control information from the CPU.

The first control information may carry at least one of address information and operation information or both as the original control information.

In an embodiment, the first control information may indicate a first address to be accessed by the memory controller. For example, the to-be-checked signal may be a signal which carries information indicating one physical address or a sequence of physical addresses for the memory controller to write a data value into that physical address or write data values into those physical addresses.

S303: the memory controller determines the first control information according to the to-be-checked signal.

On receiving the to-be-checked signal, since it contains the first control information generated by the subsystem, the memory controller may determine the first control information in the to-be-checked signal.

S304: the memory controller checks correctness of the first control information according to the original checking information.

The memory controller may create first checking information based on the first control information and determine whether the original checking information corresponds to the first checking information.

In an embodiment, the memory controller may determine whether a predefined condition is satisfied between the original checking information and the first checking information. For example, the predefined condition may be that the original checking information is in consistency with the first checking information, or the predefined condition may be that the original checking information and the first checking information match an expected value.

The memory controller may determine that the control signal is correct if the predefined condition is satisfied, otherwise, the memory controller flags an error.

In an embodiment, the original checking information and the first checking information are both computed based on any one of the following: cyclic redundancy checks (CRC), error checking and correction (ECC) or parity checks. Here the original checking information and the first checking information are computed using the same method.

As described above, the checking device could also be one of the subsystems. In this case, the checking may be done at the subsystem as follows.

Generally, the subsystem receives a control signal carrying the original control information and the original checking information from the CPU, then generate second control information according to the original control information, compute second checking information according to the second control information, and determine whether the original checking information corresponds to the second checking information.

The subsystem here may first obtain a control signal. In an embodiment, the control signal may be transmitted by the CPU and carries at least one of address information and operation information or both. The control signal here may refer to all the signals other than the data signal, for example, the control signal may carry information about address and/or operations to be executed by the checking device.

In an embodiment, the control signal may carry original control information to be executed by the checking device.

In an embodiment, the original control information may indicate an original address to be accessed by the subsystem. For example, the control signal may be a signal which carries information indicating one virtual address or a sequence of virtual addresses for the checking device to write a data value into that virtual address or write data values into those virtual addresses.

In an embodiment, the original control information may indicate one original operation or a sequence of operations to be executed by the subsystem. For example, the control signal may be a signal which carries information indicating the subsystem to perform a writing operation.

In an embodiment, the original control information may indicate an original address to be accessed by the subsystem and an original operation to be executed by the subsystem. For example, the control signal may be a signal which carries information indicating the subsystem to write into a virtual address.

It should be noted that the above address may be a sequence of addresses. That is to say, the original control information may indicate a sequence of addresses to be accessed by the subsystem or a sequence of operations to be executed by the subsystem or both. Besides, the original control information may be information indicating the address or the operation or both, it may also be directly the address or the operation or both, which is not limited herein.

In addition to the original control information to be executed by the subsystem, the control signal may carry original checking information which is pre-computed and transmitted to the subsystem for verifying correctness of the generated control information.

After obtaining the control signal, the subsystem generates second control information according to the control signal.

In order to execute corresponding operations, the checking device may generate second control information according to the control signal.

As described above, the control signal may carry the original control information which indicates at least one of an original address to be accessed by the subsystem and an original operation to be executed by the subsystem, the second control information may be generated based on the original control information. Correspondingly, the second control information generated according to the original control information may include at least one of a second address corresponding to the original address and a second operation corresponding to the original operation.

The second control information corresponds to the original control information. That is, if the original control information indicates an original address to be accessed by the subsystem, the second control information then includes a second address corresponding to the original address; if the original control information indicates an original operation to be executed by the subsystem, the second control information then includes a second operation corresponding to the original operation; if the original control information indicates both of an original address to be accessed by the subsystem and an original operation to be executed by the subsystem, the second control information then includes both of a second address corresponding to the original address and a second operation corresponding to the original operation.

Continue with the above example, as describe in step 201, when the original control information indicates an original virtual address for the subsystem to write a data value into that virtual address, the subsystem generates the second control information including a second address corresponding the original virtual address; when the original control information indicates the subsystem to perform a writing operation, the subsystem also generates the second control information corresponding to the writing operation. Corresponding second control information may be generated if the original control information indicates the both.

As noted above, if the original control information indicates a sequence of virtual addresses to be accessed by the subsystem, the second control information may also include a corresponding sequence of virtual addresses.

The subsystem then checks correctness of the second control information according to the original checking information.

After generating the second control information, the subsystem may perform the checking so as to determine the correctness or integrity of the generated second control information.

The checking is performed based on original checking information corresponding to the original control information and second checking information corresponding to the second control information.

In an embodiment, after generating the second control information, the subsystem further computes the second checking information according to the second control information.

After obtaining the second checking information, the subsystem may determine whether the original checking information corresponds to the second checking information. In an embodiment, the subsystem may determine whether a predefined condition is satisfied between the original checking information and the second checking information. For example, the predefined condition may be that the original checking information is in consistency with the second checking information, or the predefined condition may be that the original checking information and the second checking information match an expected value.

The subsystem may determine that the control signal is correct if the predefined condition is satisfied, otherwise, the subsystem flags an error.

In an embodiment, the original checking information and the second checking information are both computed based on any one of the following: cyclic redundancy checks (CRC), error checking and correction (ECC) or parity checks. Here the original checking information and the second checking information are computed using the same method.

As can be seen from the above description, the original checking information is determined once the control signal is received, in actual practice, when the CPU transmits an instruction to the subsystem (for example, an accelerator), the original checking information may be pre-computed at the CPU and then transmitted along with the instruction to the accelerator, or, may be calculated by the accelerator before the generating of the second control information, in this way, the control signal, which may be address or control signaling may be checked with minimal hardware area/cost and minimal to no computational overhead.

The checking may also be done at the memory controller, in this case, comparing with the existing control signal passing from the subsystem to the memory controller, the to-be-checked signal may no longer contain redundancy bits for checking, thus saving the cost. The checking at the memory controller may ensure higher accuracy at the cost of more complexity, since the checking in this case covers more components The above method may be applied to check the integrity of the control signal in many scenarios. For example, when processing an image, where a frame of data may be read from or written into a fixed buffer at a deterministic frequency, in this scenario, the manner for accessing the buffer is actually deterministic. Suppose that there are two buffers (Buffer A and Buffer B) to be used by an application for reading data from or writing data into a memory. The number of the buffers here is just for illustrative purposes, which may be changed according to actual situations.

Take the reading operation as an example, the above method may be executed as follows:

In step S201, the subsystem may receive a reading signal, where the reading signal may include:

two start pointers indicating the starting addresses to be read by the subsystem in both buffers;

two maximum transaction lengths indicating the maximum address intervals to be read by the subsystem in both buffers;

the number of times for performing the reading operation; and the increment of the address indicating the space size between two adjacent addresses in a sequence of addresses.

Assume a two line/tile frame, with a buffer stride of 4096 bytes in below example. The buffers (and hence start pointers) are typically allocated at application start and are fixed until application.

For Buffer A, the start pointer of Buffer A in the original tile of the original frame=0xE000_0000, the start pointer of Buffer A in the second tile of the original frame=0xE000_1000, the number of times for performing the reading operation=1, the increment of the address=0x7.

For Buffer B, the start pointer of Buffer B in the original tile of the original frame=0xE600_0000, the start pointer of Buffer B in the second tile of the original frame=0xE600_1000, the increment of the address=0x7, the number of times for performing the reading operation=1.

In this example, the reading signal does not include the pre-computed original control information, so in step S202, the original control information may be determined and then the original control information may be computed based on the original control information. It should be noted that if the reading command includes the pre-computed original control information, then the determining of the pre-computed original control information may be simply the read signal.

Starting from the start pointer and incrementing it by the increment of the address each time until reaching the maximum address increment, the subsystem may determine the original control information as sequences of addresses for both buffers. As shown in Table I to Table IV. Table I and Table II show the sequence of addresses determined as the original control information for the original frame, Table III and Table IV show the sequence of addresses determined as the original control information for the second frame. Here only four addresses are listed in the tables for illustrative purposes.

TABLE I

| | First tile | | | |
|---|---|---|---|---|
| Sequence of addresses | 0xE000_0000 | 0xE000_0100 | 0xE000_0200 | 0xE000_0300 |
| Burst | 0x7 | 0x7 | 0x7 | 0x7 |
| Pre-computed CRC | | | | First pre-computed CRC |

TABLE II

| | Second tile | | | |
|---|---|---|---|---|
| Sequence of addresses | 0xE000_1000 | 0xE000_1100 | 0xE000_1200 | 0xE000_1300 |
| Burst | 0x7 | 0x7 | 0x7 | 0x7 |
| Pre-computed CRC | | | | Second pre-computed CRC |

TABLE III

| | First tile | | | |
|---|---|---|---|---|
| Sequence of addresses | 0xE600_0000 | 0xE600_0100 | 0xE600_0200 | 0xE600_0300 |
| Burst | 0x7 | 0x7 | 0x7 | 0x7 |
| Pre-computed CRC | | | | Third pre-computed CRC |

TABLE IV

| | Second tile | | | |
|---|---|---|---|---|
| Sequence of addresses | 0xE600_1000 | 0xE600_1100 | 0xE600_1200 | 0xE600_1300 |
| Burst | 0x7 | 0x7 | 0x7 | 0x7 |
| Pre-computed CRC | | | | Fourth pre-computed CRC |

For Buffer A, the original control information includes the sequence of addresses for the original tile of the original frame (which are 0xE000_0000, 0xE000_0100, 0xE000_0200, 0xE000_0300 shown in Table I) and the sequence of addresses for the second tile of the original frame (which are 0xE000_1000, 0xE000_1100, 0xE000_1200, 0xE000_1300 shown in Table II); for Buffer B, the sequence of addresses for the original tile of the original frame (which are 0xE600_0000, 0xE600_0100, 0xE600_0200, 0xE600_0300 shown in Table III) and the sequence of addresses for the second tile of the second frame (which are 0xE600_1000, 0xE600_1100, 0xE600_1200, 0xE600_1300 shown in Table IV).

After determining the original control information, the subsystem may compute the original checking information based thereon. The original checking information corresponding to the original control information may be computed based on a predefined rule. Here the predefined rule defines the method and the unit for computing the checking information. As described in step S204, the method may be any one of CRC, ECC, parity check or any other checking methods, which is not limited herein. The unit for computing the checking information may be changed according to actual needs. Higher accuracy may be achieved with a smaller unit but at higher costs.

For example, if CRC is used to implement the checking, then the original checking information may be pre-computed CRCs for the sequences of addresses.

If the computing unit is one CRC per tile, then, according to the original control information (the sequences of addresses for both tiles of both frames), four pre-computed CRCs may be computed as the original checking information, including: an original pre-computed CRC computed based on the sequence of addresses for the original tile of the original frame (which are 0xE000_0000, 0xE000_0100, 0xE000_0200, 0xE000_0300 in Table I); a second pre-computed CRC computed based on the sequence of addresses for the second tile of the original frame (which are 0xE000_1000, 0xE000_1100, 0xE000_1200, 0xE000_1300 in Table II); a third pre-computed CRC computed based on the sequence of addresses for the original tile of the second frame (which are 0xE600_0000, 0xE600_0100, 0xE600_0200, 0xE600_0300 in Table III); and a fourth pre-computed CRC computed based on the sequence of addresses for the second tile of the second frame (which are 0xE600_1000, 0xE600_1100, 0xE600_1200, 0xE600_1300 in Table IV).

If the computing unit is one CRC per frame, then, according to the original control information (the sequences of addresses for both tiles of both frames), two pre-computed CRCs may be computed as the original checking information, including an original pre-computed CRC computed based on the sequence of addresses for the original frame (which are 0xE000_0000, 0xE000_0100, 0xE000_0200, 0xE000_0300, 0xE000_1000, 0xE000_1100, 0xE000_1200, 0xE000_1300 in Tables I and II), a second pre-computed CRC computed based on the sequence of addresses for the second frame (which are 0xE600_0000, 0xE600_0100, 0xE600_0200, 0xE600_0300, 0xE600_1000, 0xE600_1100, 0xE600_1200, 0xE600_1300 in Tables III and IV).

In step 203, the subsystem may generate the second control information according to the original control information. As described above, the generated second control information may be sequences of addresses for both buffers. For example, for Buffer A, the second control information includes the generated sequence of addresses for both tiles of both frames.

In an embodiment, the control signal may include a burst signal indicating the increment of the address. The increment may vary within a tile. As shown in Table I, where the burst equals to 0x7, for Buffer A, if the increment equals to 0x7 at the beginning and changes to 0x3 from the third address in the original tile, then the sequence of addresses in the original tile may be determined as 0xE000_0000, 0xE000_0100, 0xE000_0200 and 0xE000_0280. In practice, the increment may vary according to actual needs.

In step S204, the subsystem checks correctness of the second control information according to the original checking information. Originally, the second checking information corresponding to the second control information may be computed based on a predefined rule and then the correctness of the second control information may be determined by comparing the second checking information with the pre-computed original checking information. Here the predefined rule defines the method and the unit for computing the checking information. As described in step S204, the method may be any one of CRC, ECC, parity check or any other checking methods, which is not limited herein. The unit for computing the checking information may be changed according to actual needs. Higher accuracy may be achieved with a smaller unit but at higher costs.

For example, if CRC is used to implement the checking, then the original checking information may be pre-computed CRCs for the sequences of addresses.

If the computing unit is one CRC per tile, similar to the computation of the original checking information, according to the second control information (the generated sequences of addresses for both tiles of both frames), four generated CRCs may also be computed as the second checking information, including an original generated CRC for the original tile of the original frame, a second generated CRC for the second tile of the original frame, a third generated CRC for the original tile of the second frame and a fourth generated CRC for the second tile of the second frame.

If the computing unit is one CRC per frame, similar to the computation of the original checking information, according to the second control information (the generated sequences of addresses for both tiles of both frames), two generated CRCs may also be computed as the second checking information, including an original generated CRC for the original frame and a second generated CRC for the second frame.

After obtaining the original and second checking information, the subsystem may compare the checking information so as to check the correctness or integrity of the control signal. For example, the pre-computed CRC, serving as the original checking information, may be compared with the corresponding generated CRC, if the two CRCs are consistent, then the control signal is determined to be correct; otherwise, an error may be flagged. Alternatively, if the two CRCs match an expected value, if there is a delta, an error may be flagged.

As described above, the above method for checking a to-be-checked signal may be done in the subsystem, i.e., at the beginning of the system shown in FIG. 1, thus achieving the checking on the control signal (including information about address and/or operation to be executed) with lower costs. Besides, through checking the sequence of addresses generated by the source (the subsystem), the checking efficiency may be improved. Comparing with other techniques in prior art, the CRC/ECC computation on address/control channels is performed in advance of (deterministic)

transactions, possibly once at start of application, thereby saving chip power, saving CPU/DSP compute resources and chip DDR bandwidth. In addition, since the address and control signals are checked before accessing the memory, there is no need to add redundancy bits when transmitting data or control signals, thus saving bandwidth and implementation cost, and enabling reliability and functional safety in existing designs with minimal overhead. Also, the technical solution of the present disclosure provides reliability/functional safety on paths in existing chips (based on safety use case).

The above description about the computation of the CRC and the checking may also be applied to the memory controller, which will not be described in detail herein for the sake of brevity.

It should be noted that the interaction between the subsystem and the CPU is similar to the interaction between the memory and the subsystem, when the method is performed by the memory controller, the virtual address described above may be substituted by a corresponding physical address, other operations may be similar to those performed by the subsystem, which will not be repeated herein again.

Figure 4:
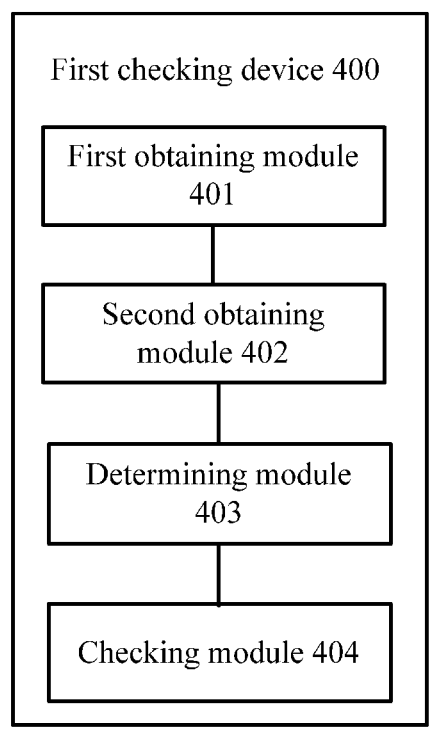
FIG. 4 is a structural view of a checking device according to an embodiment of the present disclosure.

FIG. 4 is a structural view of a first checking device according to an embodiment of the present disclosure. The first checking device 400 includes a first obtaining module 401, a second obtaining module 402, a determining module 403 and a checking module 404.

The first obtaining module 401 is configured to obtain a to-be-checked signal carrying first control information, wherein the first control information is generated based on original control information; the second obtaining module 402 is configured to obtain original checking information; the determining module 403 is configured to determine the first control information according to the to-be-checked signal; and the checking module 404 is configured to check correctness of the first control information according to the original checking information.

In an embodiment, the checking module 404 is configured to: create first checking information based on the first control information; and determine whether the original checking information corresponds to the first checking information.

The present disclosure further provides a first checking device including a processor means and a memory means. The memory means can store a computer program, and the processor means can execute the computer program stored in the memory means.

In an embodiment, the processor can call the computer program stored in the memory means to perform corresponding operations of the memory controller in the method embodiments, which will not be repeated for the sake of brevity.

The present disclosure further provides a second checking device including a processor means and a memory means. The memory means can store a computer program, and the processor means can execute the computer program stored in the memory means.

In an embodiment, the processor can call the computer program stored in the memory means to perform corresponding operations of the subsystem in the method embodiments, which will not be repeated for the sake of brevity.

The present disclosure further provides a system on chip including a checking device, the checking device implements the method for checking a to-be-checked signal in the method embodiments.

Terms such as "first", "second" and the like in the specification and claims of the present disclosure as well as in the above drawings are intended to distinguish different objects, but not intended to define a particular order.

The term such as "and/or" in the embodiments of the present disclosure is merely used to describe an association between associated objects, which indicates that there may be three relationships, for example, A and/or B may indicate presence of A only, of both A and B, and of B only.

The term "a" or "an" is not intended to specify one or a single element, instead, it may be used to represent a plurality of elements where appropriate.

It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

In the embodiments of the present disclosure, expressions such as "exemplary" or "for example" are used to indicate illustration of an example or an instance. In the embodiments of the present disclosure, any embodiment or design scheme described as "exemplary" or "for example" should not be interpreted as preferred or advantageous over other embodiments or design schemes. In particular, the use of "exemplary" or "for example" is aimed at presenting related concepts in a specific manner.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise a random access memory (RAM), a read-only memory (ROM), an electrically erasable programmable ROM (EEPROM), a compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for checking a to-be-checked signal, comprising:
    obtaining, by a memory controller, the to-be-checked signal carrying first control information, wherein the first control information is generated based on original control information;
    obtaining, by the memory controller, original checking information from a central processor unit (CPU);
    determining, by the memory controller, the first control information according to the to-be-checked signal; and
    checking, by the memory controller, first checking information based on the first control information and determining, by the memory controller, whether the original checking information corresponds to the first checking information;
    the method further comprises:
    receiving, by a subsystem, a control signal from the CPU carrying the original control information and the original checking information;
    generating, by the subsystem, second control information according to the original control information;
    computing, by the subsystem, second checking information according to the second control information; and
    determining, by the subsystem, whether the original checking information corresponds to the second checking information.

2. The method according to claim 1, wherein the original control information indicates at least one of an original address to be accessed by a checking device and an original operation to be executed by the checking device.

3. The method according to claim 2, wherein the first control information indicates at least one of a first address corresponding to the original address and a first operation corresponding to the original operation.

4. The method according to claim 2, wherein the second control information comprises at least one of a second address corresponding to the original address and a second operation corresponding to the original operation.

5. The method according to claim 1, wherein each of the original checking information, the first checking information and the second checking information is computed based on any one of the following: cyclic redundancy checks (CRC), error checking and correction (ECC) or parity checks.

* * * * *